(12) United States Patent
Hoffman

(10) Patent No.: US 9,284,973 B2
(45) Date of Patent: Mar. 15, 2016

(54) MAGNETIC WALL ANCHORING SYSTEM

(71) Applicant: Ronald A. Hoffman, Lake Zurich, IL (US)

(72) Inventor: Ronald A. Hoffman, Lake Zurich, IL (US)

( * ) Notice: Subject to any disclaimer, the term of this patent is extended or adjusted under 35 U.S.C. 154(b) by 274 days.

(21) Appl. No.: 13/887,372

(22) Filed: May 6, 2013

(65) Prior Publication Data

US 2013/0291366 A1   Nov. 7, 2013

Related U.S. Application Data

(60) Provisional application No. 61/643,285, filed on May 6, 2012.

(51) Int. Cl.
| | |
|---|---|
| F16B 35/04 | (2006.01) |
| F16B 13/08 | (2006.01) |
| F16B 1/00 | (2006.01) |
| H01F 7/02 | (2006.01) |

(52) U.S. Cl.
CPC .............. *F16B 35/04* (2013.01); *H01F 7/0252* (2013.01); *F16B 13/0808* (2013.01); *F16B 2001/0035* (2013.01); *Y10T 24/32* (2015.01); *Y10T 29/4995* (2015.01); *Y10T 29/49947* (2015.01); *Y10T 29/49948* (2015.01); *Y10T 29/49963* (2015.01)

(58) Field of Classification Search
CPC ................. F16B 35/04; F16B 13/0808; F16B 2001/0035; H01F 7/0252; Y10T 24/32; Y10T 29/49948; Y10T 29/49947; Y10T 29/49945

USPC .......... 29/525.01–525.03, 525.11; 248/206.5, 248/216.1, 217.3, 309.4, 683, 201, 205.2, 248/217.2

See application file for complete search history.

(56) References Cited

U.S. PATENT DOCUMENTS

| | | | | | |
|---|---|---|---|---|---|
| 1,624,741 | A | * | 4/1927 | Leppke et al. | 40/621 |
| 2,144,895 | A | * | 1/1939 | Place | 411/342 |
| 2,380,724 | A | * | 7/1945 | Crooks | 411/414 |
| 2,521,885 | A | * | 9/1950 | Vasquez | 292/251.5 |
| 2,771,259 | A | * | 11/1956 | Laystrom | 248/489 |
| 2,771,262 | A | * | 11/1956 | Laystrom | 248/489 |
| 3,111,736 | A | * | 11/1963 | Budreck | 24/303 |
| 3,239,178 | A | * | 3/1966 | Pompa | 248/205.3 |
| 3,245,165 | A | * | 4/1966 | Podoloff | 40/591 |
| 3,713,614 | A | * | 1/1973 | Taylor | 248/632 |
| 4,422,137 | A | * | 12/1983 | Watts | 362/390 |
| 4,518,080 | A | * | 5/1985 | Ohlson | 206/39 |
| 4,765,077 | A | * | 8/1988 | Rosenthal et al. | 40/308 |
| 4,773,175 | A | * | 9/1988 | Larsen | 40/308 |
| 4,852,919 | A | * | 8/1989 | Nimee et al. | 292/251.5 |
| 4,875,654 | A | * | 10/1989 | Chandonnet et al. | 248/467 |
| 4,883,398 | A | * | 11/1989 | Duncan | 411/344 |
| 5,050,834 | A | * | 9/1991 | Tardiff | 248/467 |
| D330,817 | S | * | 11/1992 | Lemire | D6/466 |
| D331,162 | S | * | 11/1992 | Lemire | D6/466 |

(Continued)

*Primary Examiner* — David Bryant
*Assistant Examiner* — Bayan Salone
(74) *Attorney, Agent, or Firm* — Kevin E. Remus

(57) ABSTRACT

An apparatus and method are provided for affixing an object to a surface. In an exemplary embodiment, the apparatus includes a magnet formed with an opening at its center. The magnet is attached to the surface by inserting a screw into the opening. A spacer and a flat washer are attached to the screw, with the spacer being positioned between the flat washer and the magnet. After the screw is affixed to the surface, a metal object can be magnetically attached to the screw and magnet to secure the object to the surface. A backer plate is also contemplated for securing non-magnetic objects to the screw and magnet. Multiple backer plates can be affixed to objects to support a greater amount of weight if required.

13 Claims, 2 Drawing Sheets

(56) References Cited

U.S. PATENT DOCUMENTS

| | | | |
|---|---|---|---|
| 5,304,024 A * | 4/1994 | Schuster | 411/418 |
| 5,577,696 A * | 11/1996 | Kramer | 248/206.5 |
| 5,585,809 A * | 12/1996 | Yajima et al. | 343/713 |
| 5,757,327 A * | 5/1998 | Yajima et al. | 343/713 |
| 5,887,917 A * | 3/1999 | Luciana | 292/251.5 |
| 5,895,018 A * | 4/1999 | Rielo | 248/206.5 |
| 6,186,466 B1 * | 2/2001 | Baird et al. | 248/475.1 |
| 6,216,888 B1 * | 4/2001 | Chien | 211/87.01 |
| 6,305,656 B1 * | 10/2001 | Wemyss | 248/309.4 |
| 6,315,254 B1 * | 11/2001 | Maloney | 248/205.3 |
| 6,450,748 B1 * | 9/2002 | Hsu | 411/387.4 |
| 6,487,767 B1 * | 12/2002 | Reid et al. | 29/522.1 |
| 6,658,697 B2 * | 12/2003 | Liao | 16/82 |
| 6,711,801 B2 * | 3/2004 | Pulfer | 29/456 |
| 6,895,642 B2 * | 5/2005 | Huang | 24/303 |
| 6,974,290 B2 * | 12/2005 | Pountney | 411/384 |
| 7,082,664 B2 * | 8/2006 | Powers et al. | 29/525.02 |
| 7,145,425 B2 * | 12/2006 | Clement | 335/285 |
| 7,209,021 B2 * | 4/2007 | Clement | 335/285 |
| 7,226,261 B1 * | 6/2007 | Bristol | 411/342 |
| 7,506,464 B2 * | 3/2009 | Tarter et al. | 40/596 |
| 7,744,051 B2 * | 6/2010 | Joyce et al. | 248/220.31 |
| 7,832,173 B2 * | 11/2010 | Crawford et al. | 52/690 |
| 8,042,308 B2 * | 10/2011 | Sullivan et al. | 52/238.1 |
| 8,333,356 B2 * | 12/2012 | Ernst et al. | 248/304 |
| 8,359,722 B2 * | 1/2013 | Polizzi | 29/402.01 |
| 8,434,730 B2 * | 5/2013 | Ahlstrom | 248/467 |
| 8,448,910 B2 * | 5/2013 | Ernst et al. | 248/304 |
| 8,490,936 B2 * | 7/2013 | Rinck | 248/309.4 |
| 8,858,013 B2 * | 10/2014 | Attey et al. | 362/126 |
| 8,864,188 B2 * | 10/2014 | Redgrave | 292/251.5 |
| 2006/0237605 A1 * | 10/2006 | Joyce et al. | 248/206.5 |
| 2008/0080949 A1 * | 4/2008 | Deng et al. | 411/342 |
| 2010/0281671 A1 * | 11/2010 | De Vaan | 29/428 |
| 2011/0001025 A1 * | 1/2011 | Fiedler | 248/206.5 |
| 2011/0011994 A1 * | 1/2011 | Ahlstrom | 248/205.4 |
| 2011/0080009 A1 * | 4/2011 | Redgrave | 292/251.5 |
| 2011/0173792 A1 * | 7/2011 | Polizzi | 29/402.11 |
| 2012/0280098 A1 * | 11/2012 | Rinck | 248/304 |

* cited by examiner

MAGNETIC WALL ANCHORING SYSTEM

This application claims the benefit of U.S. Provisional Patent Application Ser. No. 61/643,285, filed May 6, 2012.

TECHNICAL FIELD

The technical field pertains to apparatuses and methods for securing objects to surfaces, and more particularly pertains to apparatuses and methods for using magnets to secure objects to vertical surfaces, and in particular, for securing objects to walls.

BACKGROUND

Various apparatuses and methods are commonly used to secure objects to vertical surfaces, namely walls. These apparatuses and methods involve varying degrees of difficulty and also require the use of a plurality of tools and hardware to ensure that objects: (1) remain secured to the wall and (2) are oriented properly. The use of current apparatuses and methods can be time-consuming and require a level of precision that may require the services of a professional. The process of securing an object to a wall is time-intensive and can also cause damage to the wall because multiple holes are often made in order to accomplish a proper orientation of an object.

Widely known methods used to secure an object to a wall involve taking preparatory measurements for ensuring a proper orientation. This requires the use of various tools and accessories including a measuring device, a marking tool, and a level. After the wall is prepared, some type of hardware may be affixed to the object being secured to the surface. Commonly used hooks or latches are often of poor quality and also tend to become dislodged or unattached from the object. These types of hooks and latches are often not strong enough to support the weight of the object, which can cause the object to fall off of the wall. When this occurs, the object can be damaged, the wall can be damaged, the floor can be damaged, and injuries may occur if the falling object strikes a person.

Another common problem that can occur is that an object will not be oriented properly once the process of securing the object to the wall is completed. This means that the process has to be repeated, which will lead to additional damage to the wall if additional holes must be made in the wall to accomplish a proper orientation.

When an object is secured to a wall, it is difficult and time-consuming to move the object to a different location. Objects cannot be moved easily when a person wants to redecorate by changing an object's location. Instead, when a person desires to change the location of an object, the laborious process of hanging the object must be accomplished again.

Present methods of securing objects to walls typically do not account for the situation when a person accidently bumps or touches the object. When this occurs, the object and any associated hardware may become dislodged from the wall. This causes damage to the wall and also may cause damage to the object. This situation is of a particular concern on stairways or other heavily-traveled, narrow areas.

In light of the above, it is desirable to provide a wall anchoring apparatus and method that is simple to use and requires a minimum number of tools and a minimum amount of time for installation. It is also desirable to provide an anchoring apparatus that affixes objects to surfaces securely while minimizing the possibility of the object falling off of the wall. Also, it is desirable to provide an anchoring apparatus that allows for interchangeability of objects to different locations. Furthermore, it is desirable to provide an anchoring apparatus that is easy to use, is simple to manufacture and is comparatively cost effective.

SUMMARY

In accordance with an exemplary embodiment, an apparatus or assembly for anchoring objects to surfaces is provided. While objects are most commonly anchored to vertical surfaces, s like a wall, the apparatus or assembly can also be used to anchor objects to horizontal surfaces, like a ceiling. A magnet is provided that is formed with an opening at its center. This magnet can be of any shape, with a circular or disk-shaped magnet being most commonly used. Through the opening in its center, the magnet receives a threaded screw of a selected length. The length of the screw is chosen based on the characteristics of the surface onto which the object will be affixed, in particular the thickness of the surface. Several complementary pieces of hardware are also provided. These include at least one spacer and a flat washer. The flat washer contacts the exposed face of the surface, and the spacers are positioned between the flat washer and the magnet to create space between the magnet and the wall if desired. Any number of spacers can be used, and in some cases zero spacers may be used. An additional component provided as part is of the apparatus is a plurality of toggle wings that are affixed near the distal end of the screw. These toggle wings assist in securing the screw and magnet into place in a manner commonly used in the pertinent art. If the vertical surface is wood, a common wood screw may be used and toggle wings will not be required. Toggle wings are most commonly used with installation on drywall. Collectively, these components form an anchoring assembly.

Once the magnet has been secured to the wall by tightening the screw, objects can then brought into contact with the magnet for the purpose of securing the object to the wall. This can be accomplished in at least two different ways. For one, an object with magnetic properties that are attracted to the magnet can simply be placed onto the magnet at a contact point on the object. In order to change the orientation of the object, the object simply has to be adjusted by hand to a different contact point on the object. This process can be used to ensure the object is oriented properly, or the process can be used to completely change the orientation of an object.

The second way an object can be secured to the magnet is through the use of backer plates. These backer plates can be any shape and are also magnetic. The backer plates have an outer face that makes contact with the object to be secured to the vertical surface and an inner face that contacts the magnet. The backer plate is formed with a lip that that extends along the length of the perimeter of the inner face of the backer plate. This lip is formed by folding the metal in a direction from the outer face towards the inner face. The space formed between the metal lip and the inner face of the backer plate is slightly greater than the height or thickness of the magnet. By establishing this relationship between the lip and the height of the magnet, the magnet cannot slide off of the plate because the magnet will catch on the lip and remain in contact with the backer plate.

For securing the backer plate to the object, a hole is formed into the backer plate near each corner. This hole receives a screw that is used to affix the backer plate to the object that is secured to the vertical surface. A notch can be formed in the lip near each hole to allow for easier access to the holes, but the notch is never wider than the diameter of the magnet to ensure the magnet cannot slide off of the backer plate through the notch. Alternate methods of securing the object to the backer plate include glue, double-sided tape, or a hook and fastener system. Any number of backer plates can be affixed to the object, with the number of backer plates being dependent on the amount of weight that needs to be supported by the anchoring apparatus. When an object requires several backer plates, rubber stops may be attached to the frame to create friction or traction with the surface. The use of rubber stops will allow for smaller, weaker magnets to be used. In addition, objects may be constructed with backer plates already embedded in the object. As an example, a frame may be constructed with a backer plate at each corner.

A method for use of the anchoring apparatus can be described. The first step is to make a hole in the vertical surface with some type of tool, most commonly a drill, with the diameter of the hole being dependent on the diameter of the screw being used. Once this has been accomplished, the screw is prepared for insertion into the hole in the vertical surface. The user prepares the screw for insertion by determining the number of spacers to use. This will determine the distance between the wall and the magnet. The spacers slide onto the screw in the direction of the magnet and are seated properly once a spacer contacts the magnet. When the spacers are positioned properly, the flat washer is then positioned between the point end of the screw and the magnet. In this configuration, the spacers are positioned between the magnet and the flat washer. It should be noted that the combination of the screw, the magnet, the spacers, and the flat washer may be pre-assembled to form the anchor apparatus assembly with the magnet, any spacers, and the flat washer already attached to the screw.

To begin an insertion of the screw into the vertical surface, the toggle wings are depressed to allow for insertion into the hole created in the vertical surface. Once the flat washer has made contact with the wall or the toggle wings have opened, the screw is tightened. This tightening of the screw will move the toggle wings in a direction towards the magnet thereby securing the vertical surface between the flat washer and the toggle wings. At this point, the magnet is ready to use.

With the magnet properly secured against the vertical surface, objects can be affixed to the magnet. These objects can be metal objects or magnetic backer plates. If one or more backer plates are used, the backer plates must be secured to the object. This is done by using screws inserted through at least two screw holes on the backer plate. Or, the backer plates can be glued or taped to the object.

Once an object is in contact with the magnet, the user can then adjust the object to ensure proper orientation. In addition, the user can easily remove an object and place it on another magnet at a different location. This is done by simply removing the object by hand and placing it onto another magnet. No tools are necessary to accomplish this step.

If a magnet needs to be removed, the object is disengaged with the magnet. Then, the screw is loosened, and the magnet and screw can be removed from the wall. If toggle wings have been used, the toggle wings will become disengaged with the screw to allow for the screw to be removed. Another set of toggle wings can be added to the screw to allow for re-use of the screw, the magnet, the spacers, and the flat washer.

DETAILED DESCRIPTION

Figure 1:
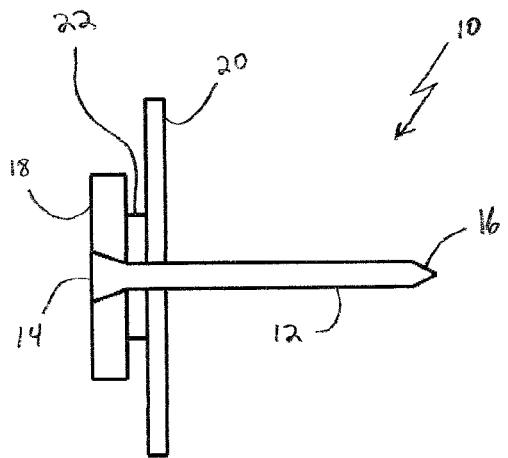
FIG. 1 is a view of an anchoring apparatus or assembly in accordance with an embodiment.

Referring initially to FIG. 1, a view of an anchoring apparatus or assembly in accordance with an embodiment is shown and generally designated 10. The anchoring assembly 10 is s constructed with a screw 12 having a head end 14 and a point end 16. As shown, the screw 12 passes through an opening in a magnet 18. Two additional components attached to the screw 12 are a flat washer 20 and a spacer 22. The anchoring assembly 10 shown in FIG. 1 is generally used for vertical surfaces comprised of wood.

Figure 2:
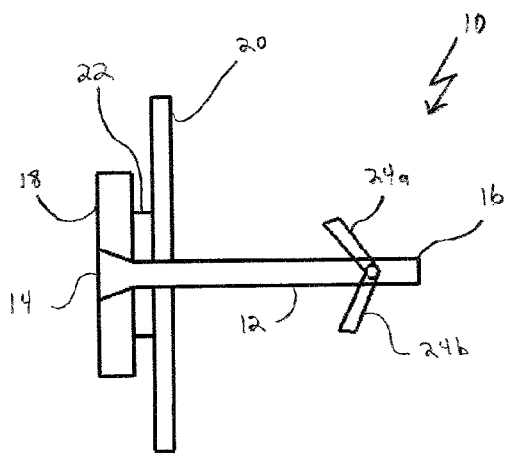
FIG. 2 is a view of an anchoring apparatus or assembly in accordance with an alternate embodiment.

In FIG. 2, another embodiment of the anchoring assembly 10 is shown. Again, the anchoring assembly 10 is formed with a screw 12 with a head end 14 and a point end 16, as well as a magnet 18. Like the embodiment in FIG. 1, the anchoring assembly 10 of FIG. 2 also has a flat washer 20 and a spacer 22. The primary difference between the anchoring assembly 10 of FIG. 1 and FIG. 2 is the use of toggle wings 24a-b. These toggle wings 24a-b are affixed near the point end 16 of the screw. The anchoring assembly 10 of FIG. 2 is used primarily for installation is into a surface made of drywall or similar material.

Figures 3A, 3B:
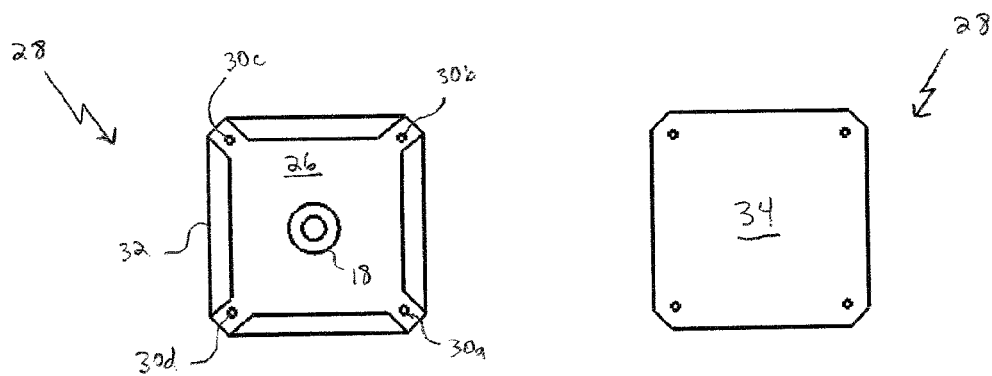
FIG. 3A is a view of the inner face of a backer plate with a magnet.
FIG. 3B is a view of the outer face of a backer plate.

Now referring to FIG. 3A, an inner face 26 of a backer plate 28 is shown. The backer plate 28 as shown is generally square in shape, but any other shape can also be used for the anchoring apparatus 10. At each corner of the backer plate 28, a screw hole 30a-d is formed in the backer plate. These screw holes 30a-d are used to affix the backer plate 28 to an object. In FIG. 3A, a magnet 18 is shown in contact with the inner face 26 of the backer plate 28. It can be seen in FIG. 2 that a lip 32 is formed around the perimeter of the backer plate 28. The lip 32 is not continuous because notches are formed at each screw hole 30a-d. The lip 32 is formed by rolling the edges of the backer plate 28 towards the inner face 26. This action creates space between the lip 32 and the inner face 26. The space formed is slightly larger than the thickness of the magnet 18 to allow for the magnet 18 to slide into the lip 32 if the object is dislodged or bumped accidentally. With this configuration, the lip 32 ensures the magnet 18 does not slide off of the backer plate 28.

Referring to FIG. 3B, an outer face 34 of the backer plate 28 is shown. The four screw holes 30a-d are visible at the corners of the backer plate 28. In some instances, the screw holes 30a-d may not be utilized to secure the backer plate 28 to an object. In these instances, the outer face 34 of the backer plate 28 may be covered with glue or double-sided tape, or any other type of adhesive material to secure the backer plate 28 to the object. The type of adhesive material chosen is largely dependent on the material with which the backer plate 28 will contact on the object.

Figure 4:
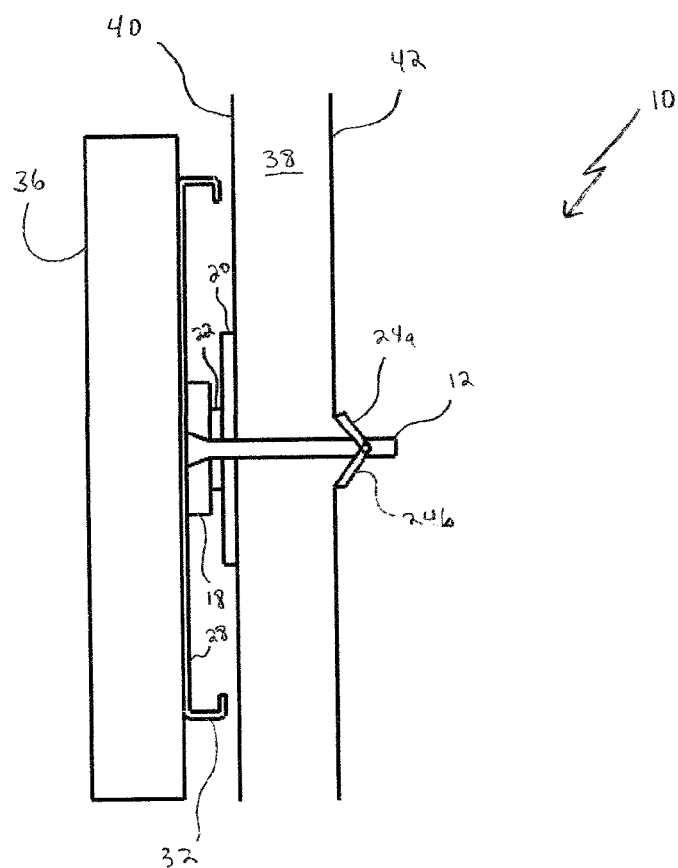
FIG. 4 is a view of the anchoring apparatus or assembly in an operational environment.

Now referring to FIG. 4, an embodiment of the anchoring apparatus 10 is shown in use in an operational environment. Here, the anchoring assembly 10 is securing an object 36 to a wall 38 having an exterior surface 40 and an interior surface 42. This is accomplished by first inserting the screw 12 through the exterior surface 38 and interior surface of the wall. In the embodiment shown in FIG. 4, toggle wings 24a-b are attached to the screw 12. It can be seen that the anchoring assembly 10 is positioned properly when the toggle wings 24a-b come into contact with the interior surface 42 of the wall 38. In order to establish the necessary contact between the toggle wings 24a-b and the interior surface 42 of the wall 38, the anchoring assembly 10 can be pulled away from the wall 38 until the toggle wings 24a-b have made contact with the interior surface 42 of the wall 38. In FIG. 4, it can be seen that when the anchoring assembly 10 is positioned properly, the flat washer 20 is in contact with the exterior surface 40 of the wall 38 and the spacer 22 is in position between the magnet 18 and the flat washer 20.

Still referring to FIG. 4, with the anchoring assembly 10 properly positioned, the object 36 can be placed onto the anchoring assembly 10. Prior to the backer plate 28 coming into contact with the anchoring assembly 10, the backer plate 28 must be affixed to the object 36 by means of screws or some type of adhesive material, with the outer face 34 of the backer plate 28 establishing contact with the object 36. Once the backer plate 28 is secured to the object 36, the inner face 26 of the backer plate 28 is placed against the magnet 18.

In FIG. 4, the relationship between the lip 32 and the magnet 18 is shown. If the object 36 was bumped or accidentally moved, the magnet 18 would slide along the inner face 26 of the backer plate 28 until the magnet 18 became engaged with the lip 32 of the backer plate 28. The lip 32 prevents the magnet from sliding off of the backer plate 28, which prevents the object 36 from becoming dislodged from the wall 38.

Figure 5:
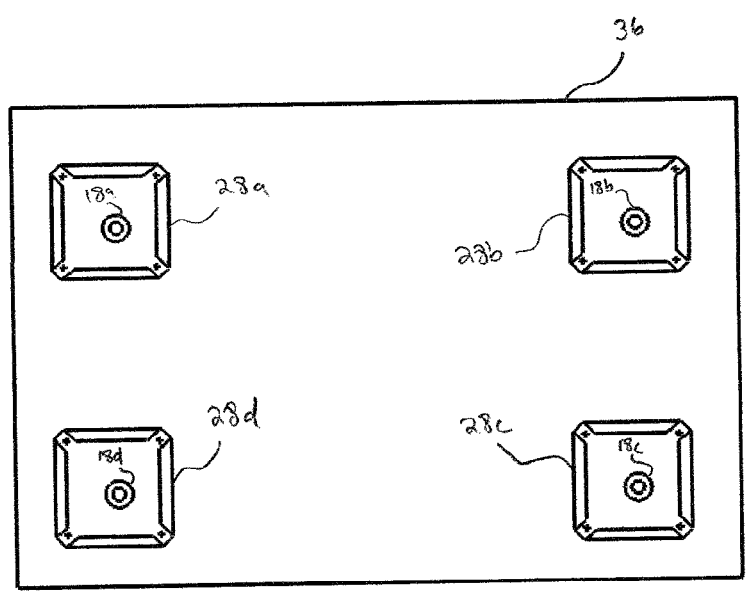
FIG. 5 is a view of a plurality of backer plates affixed to an object.

Now referring to FIG. 5, an object 36 is shown secured by four backer plates 28a-d. This illustration is provided to show the use of multiple backer plates 28a-d for securing a large or heavy object 36 to a surface. As shown, each backer plate 28a-d is in contact with a magnet 18a-d for securing the object 36 to a surface.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Various changes may be made in the function and arrangement of elements described in an exemplary embodiment without departing from the scope set forth in the appended claims.

What is claimed is:

1. An apparatus for anchoring an object to a surface, wherein the apparatus comprises:
    a magnet having a thickness "t", a first side, a second side, and a center, wherein the magnet is formed with a an opening in the center extending between the first side and the second side, and wherein the opening has a diameter "d";
    a screw having a point end and a head end, wherein the point end has a diameter "$d_1$" and is positioned in the opening in the magnet and the head end has a diameter greater than "$d_2$", wherein $d_1 < d < d_2$;
    a flat washer configured to receive the screw, wherein the flat washer is configured to contact the surface;
    a spacer positioned between the flat washer and the second side of the magnet;
    a backer plate, wherein the backer plate is formed with an outer face and an inner face, wherein the outer face is configured to be affixed to the object, and wherein the inner face is formed with a lip around the perimeter of the inner face, wherein the lip has a height "h".

2. An apparatus as recited in claim 1 wherein the screw is a wood screw.

3. An apparatus as recited in claim 2 wherein the screw is a toggle screw formed with two toggle wings attached near the point end.

4. An apparatus as recited in claim 1 wherein the object contains a metal that is attracted to the magnet.

5. An apparatus as recited in claim 1 further comprising a plurality of spacers positioned on the screw between the flat washer and the second side of the magnet.

6. An apparatus as recited in claim 1 wherein the magnet is circular in shape.

7. An apparatus as recited in claim 1 wherein the magnet is rectangular in shape.

8. An apparatus as recited in claim 1 wherein the head end of the screw is formed with a drive for tightening the screw.

9. An apparatus for anchoring an object to a surface, wherein the apparatus comprises:
    a magnet having a thickness "t", a first side, a second side, and a center, wherein the magnet is formed with a an opening in the center extending from the first side to the second side and having a diameter "d";
    a fastener having a head end and a point end, wherein the point end has a diameter "$d_1$" and configured for insertion into the opening in the magnet, wherein the head end has a diameter "$d_2$", and wherein d1<d<d2;
    a flat washer configured to receive the fastener, wherein the flat washer is configured to contact the surface; and
    a plurality of backer plates, wherein each plate is formed with an outer face and an inner face, wherein the outer face is configured to be affixed to the object, and wherein the inner face is formed with a lip around the perimeter of the inner face, wherein the lip has a height "h".

10. An apparatus as recited in claim 9 wherein the backer plate is formed with a plurality of holes.

11. An apparatus as recited in claim 10 wherein the backer plate is configured to be affixed to the object by inserting a connector into at least two of the holes.

12. An apparatus as recited in claim 9 wherein the backer plate is configured to be connected to the object with an adhesive material.

13. An apparatus as recited in claim 9 wherein the fastener is a toggle screw having a plurality of toggle wings affixed near the point end of the toggle screw for establishing contact with an interior face of the surface.

* * * * *